United States Patent [19]

Howell et al.

[11] Patent Number: 4,459,049
[45] Date of Patent: Jul. 10, 1984

[54] ABBREVIATED TYPING WITH SPECIAL FORM DISPLAY

[75] Inventors: Dan M. Howell; Robert A. Kolpek; Lisa S. Trevathan, all of Lexington, Ky.

[73] Assignee: International Business Machines Corporation, Armonk, N.Y.

[21] Appl. No.: 361,313

[22] Filed: Mar. 24, 1982

[51] Int. Cl.³ .............................................. B41J 3/02
[52] U.S. Cl. ........................................ 400/98; 400/17; 400/83; 400/171; 400/212; 364/900
[58] Field of Search .................... 400/17, 63, 70, 74, 400/83, 91, 92, 93, 94, 95, 98, 99, 212, 216.2; 364/200, 900; 355/14 SH

[56] References Cited

U.S. PATENT DOCUMENTS

| | | | |
|---|---|---|---|
| 2,717,686 | 9/1955 | Seeber, Jr. | 400/70 X |
| 3,557,927 | 1/1971 | Wright et al. | 400/70 X |
| 4,170,414 | 10/1979 | Hubert et al. | 355/14 SH |
| 4,198,685 | 4/1980 | Corwin et al. | 364/900 |
| 4,236,839 | 12/1980 | Mueller | 400/216.2 X |
| 4,244,031 | 1/1981 | Izushima et al. | 364/900 |
| 4,339,806 | 7/1982 | Yoshida | 364/900 |
| 4,355,370 | 10/1982 | Yanagiuchi | 364/900 |
| 4,374,625 | 2/1983 | Hanft et al. | 400/98 |
| 4,396,992 | 8/1983 | Hayashi et al. | 364/900 |

FOREIGN PATENT DOCUMENTS

| | | |
|---|---|---|
| 0058011 | 8/1982 | European Pat. Off. . |
| 2015220 | 9/1979 | United Kingdom . |
| 2073927 | 10/1981 | United Kingdom . |
| 2078411 | 1/1982 | United Kingdom . |

OTHER PUBLICATIONS

*IBM Technical Disclosure Bulletin*, vol. 17, No. 8, Jan. 1975, "Word Generation System for Typist," by A. Arellano et al. at pp. 2422-2423.
*IBM Technical Disclosure Bulletin*, vol. 21, No. 9, Feb. 1979, "Abbreviated Typing for Word Processing," by S. J. P. Todd at pp. 3796-3797.
*IBM Technical Disclosure Bulletin*, vol. 22, No. 12, May 1980, "Method for Capitalization Checking During Spelling Verification," by D. A. Hamilton et al. at p. 5240
IBM Technical Disclosure Bulletin, "Printing Underscore Characters and Storing Representation Thereof," Franklin, vol. 21, No. 6, Nov. 1978, pp. 2392-2393.
IBM Technical Disclosure Bulletin, "Universal Control Providing a Variety of Character Fonts to Multiple CRT Displays," Boyd et al., vol. 21, No. 9, Feb. 1979, pp. 3479-3480.
IBM Technical Disclosure Bulletin, "Automatic Continuous Underscoring of Characters, Words or Phrases," Adam et al., vol. 24, No. 8, Jan. 1982, p. 4132.

*Primary Examiner*—Ernest T. Wright, Jr.
*Attorney, Agent, or Firm*—John A. Brady

[57] ABSTRACT

In an abbreviated typing system, in which a data processor (20) transfers abbreviations typed on the keyboard (10) into longer, full words, display of words in exceptional forms is efficiently achieved. Such special forms include initial capitalized, all capitalized, initial italics, all italics and combinations of these. The sequence for capitalization is typical. When the first letter only of the abbreviation is capitalized, decision (260) (FIG. 9) of the processor (20) results in action (264), by which only the first character of the full word is capitalized. When more than one letter is capitalized, decision (260) results in action (262) by which all characters of the full word are capitalized. Underlining is effected by underlining all characters when the first letter of the abbreviation is underlined and all of the characters plus the space following the word when more than one letter of the abbreviation is underlined.

33 Claims, 11 Drawing Figures

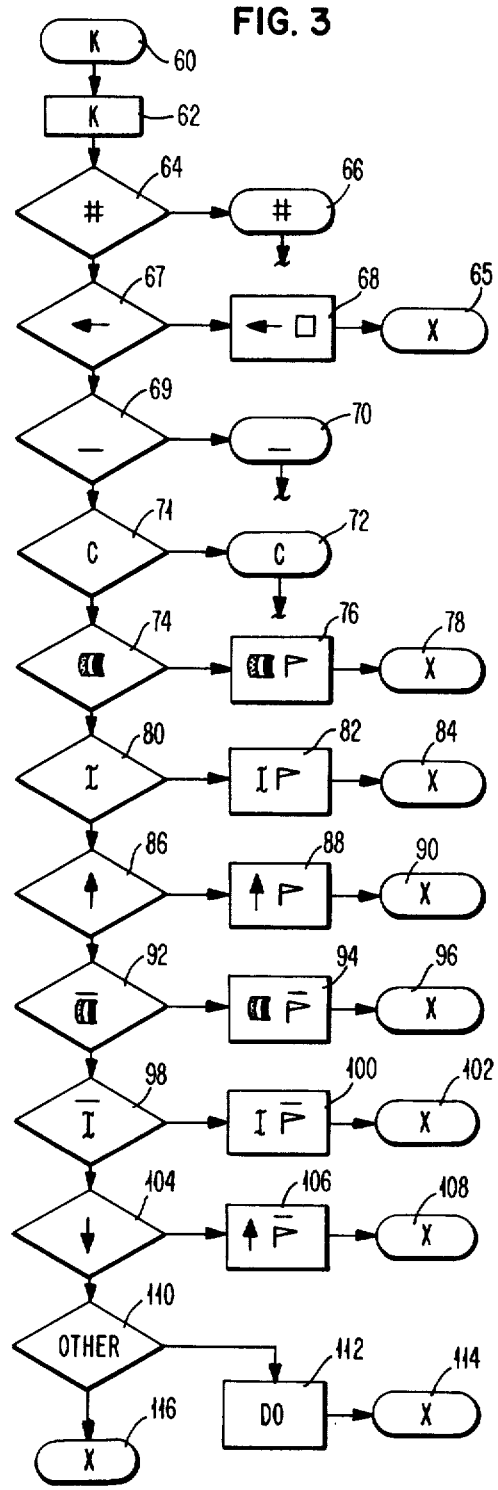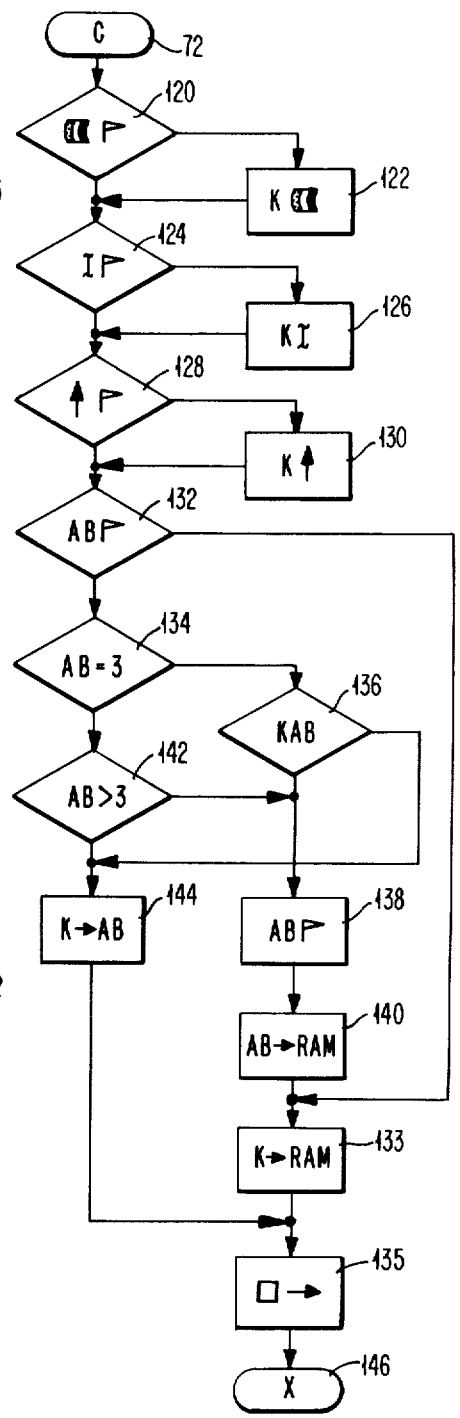
FIG. 3
FIG. 4

FIG. 5
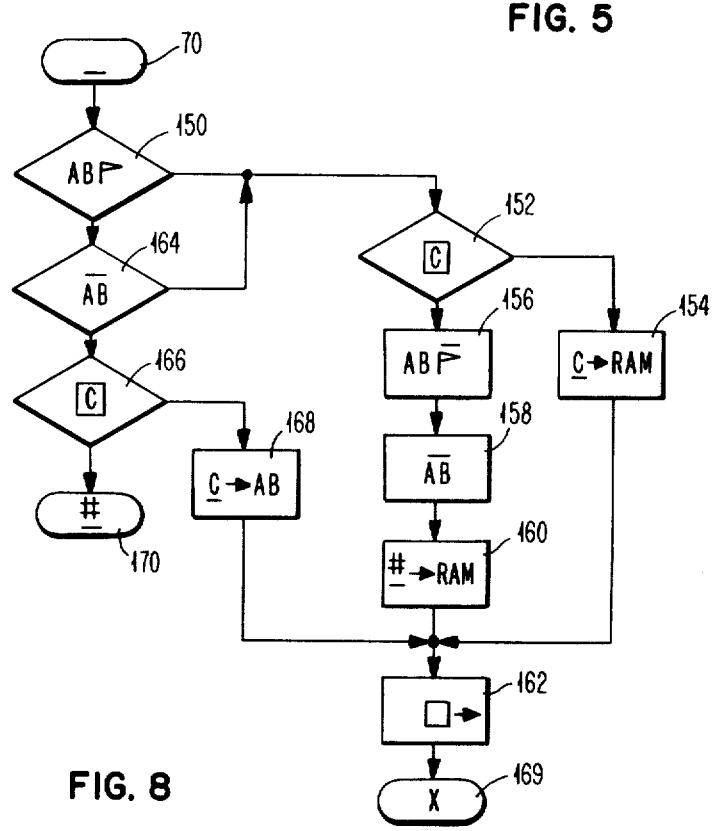
FIG. 8
FIG. 9
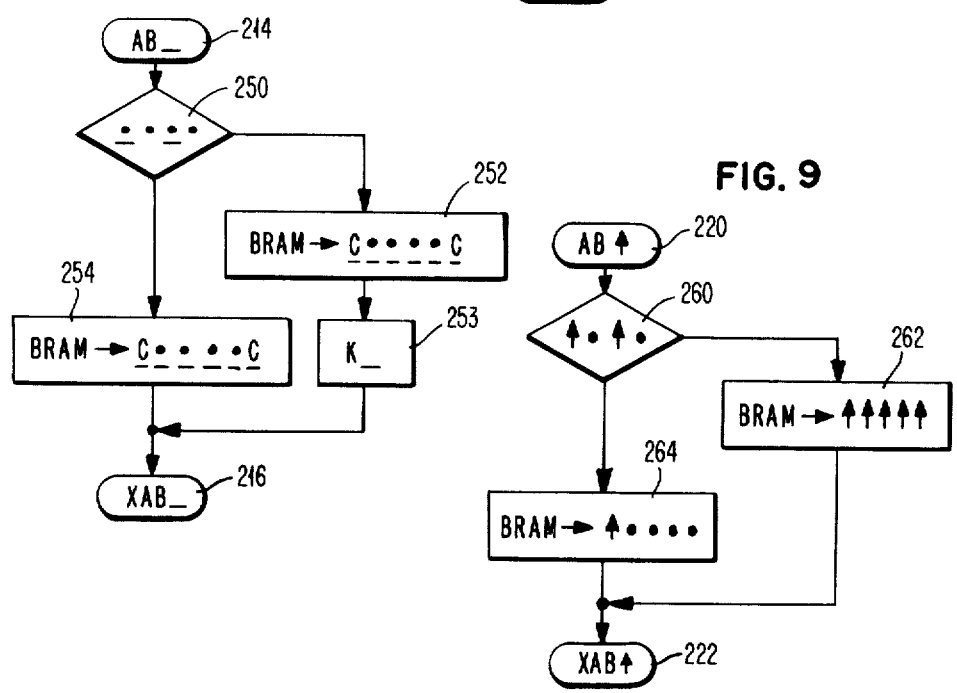

ABBREVIATED TYPING WITH SPECIAL FORM DISPLAY

DESCRIPTION

1. Technical Field

This invention relates to word processing with the aid of information-handling equipment, particularly electronic data processing equipment. Abbreviated typing is known in which the typist enters special codes of limited size into the keyboard and in which the information-handling equipment displays or prints the longer form recognized from the code. This permits an increase in the speed of typing or similar message preparation.

In such an abbreviated typing system, messages may require special forms such as entirely capitalized words, change in type font, underlining of given parts, change in color of the printing, or other characteristics of display in which the content is essentially identical but the form of display differs. This invention is directed to providing efficient and practical means to achieve such special displays while retaining the advantages of abbreviated typing.

2. Background Art

Word processing employing highly versatile, electronic data processing equipment is now generally conventional in the word processing art. Abbreviation typing employing such information-handling equipment is less common but is known generally in the prior art. *IBM Technical Disclosure Bulletin* article entitled "Word Generation System for Typist," by A. Arellano and H. Marcar, Vol. 17, No. 8 (Jan. 1975), at pp. 2422-2423 describes a system in which the information-handling equipment generates final portions of a word or phrase after the typist generates the first letters. The typist types words in their ordinary form while a data processing dictionary translates the letters as they are entered into longer complete words. When a full dictionary word is recognized, there is a tone signal, and a typist may terminate typing with a key operation which selects the full word from the dictionary.

*IBM Technical Disclosure Bulletin* article entitled "Abbreviated Typing for Word Processing," by S. J. P. Todd, Vol. 21, No. 9 (Feb. 1979) at pp. 3796-3797 describes such a typing system in which all entered words have a short form achieved by leaving out vowels and adjacent identical letters. As the typist enters the short form, a long form is automatically printed when the information handling equipment determines that the entry is an abbreviation for a single word in the machine dictionary. That system comprises a keyboard, a screen, a central processing unit, and a disc storage. Each character entered on the keyboard is displayed on the screen immediately, but by operation of the central processing unit may later be removed by replacing an abbreviation with a full word corresponding to the abbreviation. A dictionary of full words corresponding to abbreviations is stored on the magnetic disc and scanned and compared with an entered abbreviation by the data processing system.

Stenographic transcription is disclosed in U.S. Pat. No. 3,557,927 to Wright et al. That system employs a standard shorthand machine which produces abbreviated configurations for words represented by special key inputs. These abbreviated signals are transformed into electrical signals and supplied to a electronic computer. This machine has the now-standard electronic capabilities of manipulating the data at rapid speed. The computer translates the abbreviated shorthand signals into grammatical words.

As illustrated by the foregoing cited prior art, abbreviated typing is generally known in various forms. None of this known prior art, however, addresses the question of employing abbreviated typing to display the final characters in special form, such as in capitals or in all italics. So far as appears, no capability to display in special form is provided by the prior systems of abbreviated typing. The Arellano publication mentioned above, shows the input Ame completed by dictionary look-up to the word American, but does not suggest the alternative where an entire lower case ame would appear as an entire lower case output from the dictionary. Similarly that article shows an input of FRB being converted by the dictionary to Federal Reserve Board, but does not suggest what the output would be had the input been in lower case.

*IBM Technical Disclosure Bulletin* article entitled "Method for Capitalization Checking During Spelling Verification," by D. A. Hamilton et al, Vol. 22, No. 12 (May 1980) at p. 5240 teaches an information handling system for word processing in which input words are checked for proper spelling. That teaches a dictionary in data processing memory in which spelling checking is achieved by words in the dictionary which represent the alphabetic characters in lower case except for characters which must be in upper case in order for the word to be correct. (For example, in a proper name such as "Robert" the capital "R" must be in upper case.) Words entered are compared with words in the dictionary, including comparisons of characters as being upper case or lower case according to certain rules, and entered words are verified or not verified in accordance with those rules. This achieves a verification of proper capitalization and is not directed to a system in which the entered characters are fewer in number than the characters of the final words output.

DISCLOSURE OF THE INVENTION

This invention provides for the use of abbreviations for the display of words in special or exceptional conditions, such as initial capitalized, all capitalized, underlined, printed in color, and printed in italics. All abbreviations consist of at least two aliphabetic characters. The special form is designated by one or more than one of the characters in an abbreviation. The abbreviations are translated by high speed data processing means to words stored in a dictionary list in memory. A change in form of the first letter only of the abbreviation is interpreted as a change in form of part or all of the corresponding full word, while a change in form of more than one, preferably all of the characters, of an abbreviation is interpreted as a change in form of a different part of the corresponding word. More specifically, a change in form of only the first character, for example to capital, will result in the corresponding full word being capitalized only in the first character. A change in form to capital of two characters of the abbreviation will result in the full word being in all capitals. Two or more of the special display conditions may be represented in the same abbreviation, as the system permits recognition and translation to text simultaneously having the plural special forms.

Underlining is somewhat of a special case in accordance with this invention in that underlining the space after the word is the second alternative form to underlining the full word only. This recognizes that underlining a single character is not common. Specifically, in the preferred form underline of the first character of an abbreviation results in all characters of the corresponding full word being underlined. Underline of more than the first character is translated to underline of the corresponding full word and the immediately-following space.

BRIEF DESCRIPTION OF THE DRAWING

The details of this invention will be described in connection with the accompanying drawing, in which:

FIG. 3 illustrates the sequence from a key entry;

FIG. 4 illustrates the part of the sequence when the entry is a character;

FIG. 5 illustrates the part of the sequence when the entry is an underscore;

FIG. 8 illustrates the part of the abbreviation response for underline;

FIG. 9 illustrates the part of the abbreviation response for up shift;

BEST MODE FOR CARRYING OUT THE INVENTION

It should be understood that the subject matter of this invention would typically constitute one feature of a more general purpose word processing station. Such a word processing station would have the capability of revising entered materials as by changing words, relocating sections or blocks of information, automatically determining line endings, changing page sizes, and performing others of the many features now generally standard or which may be developed in the future. The subject invention is one feature which can exist essentially separate from the other features, as it functions to permit entry of words by the typist in a shortened time. This description will show only that subject matter which is directly related to this invention, it being understood as just indicated that typically this invention would be one feature of a word processing station having many diverse features to facilitate word processing and associated formatting and the like.

Figure 1:
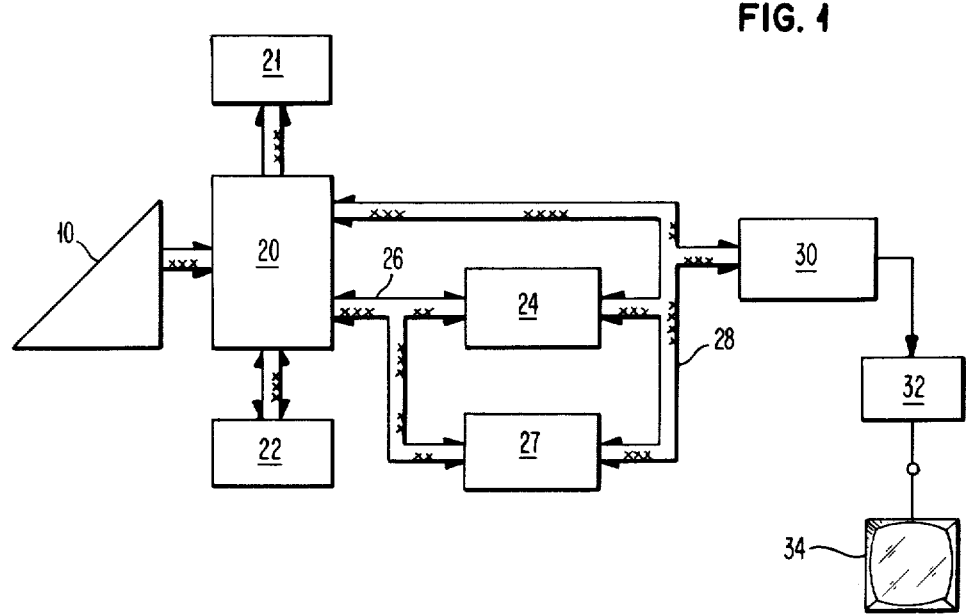
FIG. 1 illustrates the overall apparatus involved.

Reference is made to FIG. 1 which is a block diagram illustrating an overall system incorporating the subject invention. The inventive system includes an input unit, the keyboard 10, for a CPU or processor 20. In an embodiment which has been constructed, the processor 20 is implemented by a minicomputer which is more completely described in U.S. Pat. No. 4,170,414. Those skilled in the art will understand, of course, that the use of this particular processor is not essential to or is not a feature of the invention. As is shown in FIG. 1, the processor 20 also is arranged to control the printer 21 and a replaceable media recorder 22 (such as magnetic tape, card or disc). These devices are not shown or described in detail in this application, since, while they provide important capabilities to the overall system, they are, in and of themselves, conventional as is their association with the processor 20.

As shown in FIG. 1, the system has a text random access memory (RAM) 24 in connection with the processor 20 on a data/control bus 26 also connected to processor 20. On bus 26 is a cathode ray tube (CRT) controller 27, which has control logic to achieve display. Text RAM 24 and controller 27 are connected on a data/control bus 28 to character generator 30 and through character generator 30 through logic 32 to a cathode ray tube display 34. It is the cathode ray tube display 34 upon which the words appear at rapid speed as the operator types, although it would be possible to replace the cathode ray tube display 34 with a device to print immediately. In this preferred system, however, data displayed on cathode ray tube display 34 is stored in memory 24 under control of processor 20 and is subsequently printed in permanent form after the operator is satisfied with its final form. Printing is by standard data processing techniques by which the data is taken from memory 24 and used to control a standard printer 21 of some type, such as a standard impact printer similar to a typewriter.

For the purposes of this invention keyboard 10 is essentially a standard typewriter keyboard augmented with outside keys as will be described. The operator is charged with knowing the abbreviations. No abbreviation is identical with a word of the language being written (here illustrated as English). Where a word is entered which does not conform with any abbreviation in the data processing memory, that word is output in the form entered as the full word. Entries longer than the abbreviation form are also output as entered. Accordingly, in a system in which a two-letter abbreviation is being employed, entry of three letters such as "the" would result in "the" being printed. Similarly, entry of "an" followed by a space would result in "an" being printed since that would not be in the abbreviation dictionary in memory because it is in itself a standard word and therefore is not used as an abbreviation.

The abbreviations and their translations in this preferred embodiment conform to the following:

1. Each abbreviation consists of 4 or less symbols or alphabetic characters with termination of the abbreviation being by a space character.

2. Abbreviations for full words which are to be printed in a special form are keyed in with at least part of the abbreviation in that form. Specifically, where the first part only of a word is to be in that form, the first character only of the abbreviation is keyed in that form. Where all of a word is to be in that form, the typist enters at least the first two letters of the abbreviation in that form.

3. The content of each full word is the same regardless of what form is called out by changing the form of one or more characters of the abbreviation. Accordingly, the characters of an abbreviation, even though in different special form, always are translated to the same words, even though the characters may be capitalized or not capitalized and in different type styles of other special form. And, 4. The corresponding full word may contain predesignated spaces, and, accordingly, grammatically be a phrase or a title. In the following example this is illustrated by "frb" being translated to "Federal Reserve Board."

The following, under the heading "Document," illustrates a document to be created by the typist with the skill to utilize this abbreviated typing feature.

Immediately following that, under the heading of "Entry and Display" is a partial list of keystrokes utilized by the typist to obtain a corresponding word from a dictionary in memory 24 of the data processing system. The entries shown in the left column of the listing are shown as they would appear as they are typed prior to the abbreviation being replaced with full word corresponding with the abbreviations. The middle column shows the corresponding full word in the form displayed. The right column illustrates the information in the corresponding content of the dictionary memory.

DOCUMENT

TREASURY SCHEDULES SALES OF $4.5 BILLION IN NOTES NEXT WEEK

By a WALL STREET JOURNAL Staff Reporter WASHINGTON - The Treasury said it plans to raise about $1.63 billion in new cash Wednesday by selling $4.5 billion in two year notes to redeem $2.81 billion in maturing notes. Preliminary bids are to be made at the TREASURY or FEDERAL RESERVE BOARD accordingly.

| | Entry and Display | |
|---|---|---|
| KEY-BOARD | DISPLAY | DICTIONARY |
| 1a. TRS | 1a. TREASURY | 1. treasury |
| 1b. TRS | 1b. Treasury | |
| 1c. TRS | 1c. TREASURY | |
| 2. SCHS | 2. SCHEDULES | 2. schedule - s |
| 3a. BLN | 3a. BILLION | 3. billion |
| 3b. bln | 3b. billion | |
| 4. STR | 4. STREET | 4. street |
| 5. JNL | 5. JOURNAL | 5. journal |
| 6. Rpt | 6. Reporter | 6. reporter |
| 7. wsn | 7. Washington | 7. Washington |
| 8. rse | 8. raise | 8. raise |
| 9. wed | 9. Wednesday | 9. Wednesday |
| 10. selg | 10. selling | 10. sell - ing |
| 11. rdm | 11. redeem | 11. redeem |
| 12. mtrg | 12. maturing | 12. matur (e) - ing |
| 13. Prm | 13. Preliminary | 13. preliminary |
| 14. FRB | 14. FEDERAL RESERVE BOARD | 14. Federal Reserve Board |
| 15. acgy | 15. accordingly | 15. accord-ing-ly |

As indicated by the content shown in the dictionary, the information in the dictionary is that of meaning or substance and has no variable information regarding capitalization, underline or other matters of form. A word which must be capitalized is stored with the capitalization as part of the stored information. When any word from the dictionary is displayed, the word may be displayed as partial or all capitalized, underlined and in other special forms such as different color print or type font (color of print not being illustrated in the "Entry and Display" list above). In the preferred form, as a convenience to the typist, where a word from the memory dictionary is to be all in the special form, such as all capitalized, all letters of the abbreviation are entered in that special form. For example the first entry in the list is "treasury" which is to be all capitalized. As shown in the left hand column, all three letters of the abbreviation for treasury, which are "TRS," are entered from keyboard 10 as capitals. As will be clear later, the actual data handling of the system conveniently may search for only two of the members of the abbreviation in special form, and the fact that other members are in special form is essentially ignored by the data handling. As a special check for accuracy under certain purposes, the data handling could be designed to require all of an abbreviation to be in special form if all of the final word is to be in that form.

As shown in the foregoing listing, an entry "SCHS" is an abbreviation which is displayed as the word "schedules." The "s" as a final term in that abbreviation is one of several predesignated suffix abbreviations. The dictionary has two or more parts to provide for suffixes. At a typed entry of "SCH" followed by a space code entry, which is the required termination of an abbreviation, the display would have been "schedule" not the plural, "schedules." Suffix endings in an abbreviation are shown in the foregoing dictionary column as subject matter past a hyphen. Another example appears in the listing for the word "accordingly". The abbreviation for the root word, "accord", is two letters "ac". Had "ac" followed by a space been entered, the word displayed would have been "accord". Had the entry also included a "g", such that the entry was "acg" followed by a space, the suffix "ing" would have been recognized, g being the abbreviation suffix entry corresponding to ing, and the word "according" would have been displayed. The actual example shown in the list is the entry of "acgy", and the g in that entry corresponds to the ing suffix and the y is a abbreviation suffix for an ly ending. For that reason, the word displayed, as shown in the list, is "accordingly". Suffix abbreviations are generally the same for the same suffix, regardless of the root word, as an aid to the typist.

It should also be clear from the "Entry and Display" list that more than one special form may coexist in the use of this abbreviation system. Thus the word "reporter" is abbreviated by the three characters rpt. In the example shown the three characters are entered with the first character capitalized and all of the characters in italics. The dictionary simply has in memory the word "reporter" without a special designation for any special form. In accordance with this invention the fact that the first character is capitalized results in the first character of the full word being capitalized and the fact that more than one characters are in italics results in the full word "reporter" being in italics.

Finally, another aspect of the actual dictionary information in memory is indicated by the word "Wednesday" as shown in the listing. It is entered with a small w, but the dictionary stores the full word with the first word capitalized. That is a convenience to the typist in that the word Wednesday should never appear uncapitalized and, accordingly, the form stored in the dictionary memory is that in which a capital attribute is associated with the first w in the word "Wednesday."

In the system described, punctuation marks are not processed as part of an abbreviation, and the space which terminates each abbreviation is entered in final text after the corresponding full word. Where a punctuation mark is desired instead, such as the period after "accordingly", the last word of the foregoing sample document, a backspace entry will be made followed by the entry of the period. Similarly, exceptional changes within an abbreviated word, such as a single underline or capital in the middle, are made by first entering the abbreviation. When the full word is produced in final text, backspaces are entered to the point to be changed and the character in the form desired is entered. It will be clear that certain special cases could be provided for by the automatic data handling sequence if desired. In particular, an entry of a punctuation mark as the last character of an abbreviation could be processed as a special suffix common to all abbreviations, which is retained in the final text. All corresponding full words would be displayed with the punctuation mark followed by one space.

Figure 2:
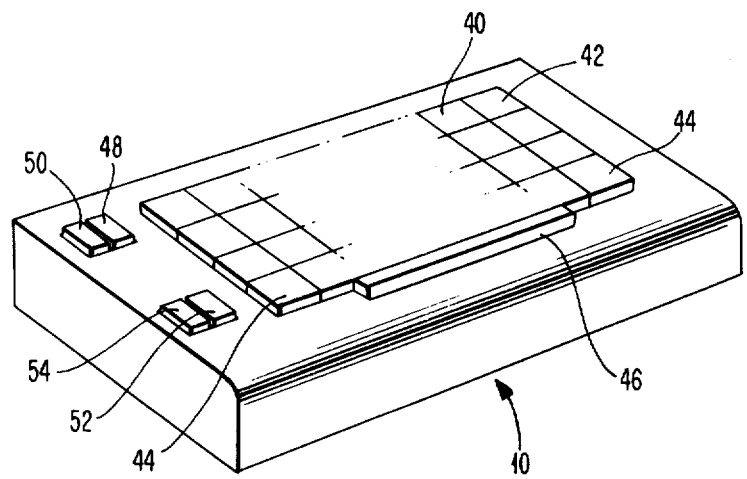
FIG. 2 illustrates the keyboard.

FIG. 2 shows the keyboard 10 with special emphasis on the keys particularly important with respect to description and application of this invention. Keyboard 10 has an underscore key 40 which inserts an underscore at the point of printing with each application of key 40. The point of printing is designated by a cursor, as will be more fully discussed. Keyboard 10 has a backspace key 42 which effects a backspace of one character for each operation of key 42. Once again, this backspace has reference to the cursor, as will be described. Keyboard 10 has two shift keys 44, as is common on typewriter keyboards, and similarly has a space bar 46, also as is common on typewriter keyboards. The remaining keys in the central part of the keyboard 10 are essentially identical to those of standard typewriter keyboards and the like. On the left are set alternate color key 48 and a restore alternate color key 50. When the key 48 is set a signal is created or recognized in the system as will be described to call for final printing to be in a color, often red, other than a standard color, usually black. Similarly, also on the left of the main bank of keyboard keys is set alternate font key 52 and restore alternate font key 54. The alternate font key 52 creates a unique code recognized in the system as calling for printing in a font, such as italics, different from the standard printing font, which typically is a less stylized form common in books and newspapers.

Reference is made once again to the foregoing sample document to be typed, shown under the heading of "Document." The typist in an operative system makes entries on keyboard 10 as follows: After entering a line return or the like so as to start printing on the left, the operator depresses a shift key 44 and then types the characters TRS. As will be described, characters TRS will appear on the CRT display 34 with the cursor now situated over a space on an empty area immediately after the S. The operator then depresses backspace key 42 three separate times, thereby bringing the cursor over the T. At this point the operator depresses the underscore key 40 three times thereby underscoring the words TRS and leaving the cursor over the blank area immediately past the S. At this point the operator depresses the space bar 46. If the system has a word underscore function, the above backspace and underscore sequence could be replaced by a single operation of keyboard 10.

The system reacts immediately and at electronic speeds to recognize the abbreviation for "treasury" and to recognize that the form is to appear as all capitalized and all underlined including the space after the Y. The display of that full word in that form appears almost immediately on the cathode ray tube display 34, with the cursor positioned immediately past the underlined space.

The operator, still having the shift key 44 depressed, then keys the S, the C, the H and the S of the abbreviation for "schedules", and then operates backspace key 42 four times, bring the cursor over the S. The typist then keys the underscore key 40 four times, once under the S, once under the C, once under the H, and once under the S. The typist then depresses space bar 46.

Once again, at electronic speeds the abbreviation for schedules is recognized and that word all capitalized and all underlined with an underline in the space to the right of that word is produced and displayed on the cathode ray tube display 34. The operator continues in this fashion rhrough the first line. The abbreviation for billion is entered in the form "BLN", followed by backspacing and underlining under the B. The operator then keys space bar 46 three times, the first two of which are effective only to move a cursor as will be described.

At the third space entry the data processor 20 translates BLN into the word "billion", underlined and all in capitals with the next space not underlined.

The operator then keys the next line in the manner as just described to produce that line all capitalized and all underlined. The operator then keys a line return or the like to start a new line. At the start of the new line, the operator first depresses the alternate font key 52. This creates a unique code signal which will be acted upon by the data-handling equipment. The operator then depresses the shift key 44 and types the character b, the operator releases the shift key 44 and types the character y which appears as a lower case. The operator then depresses space bar 46 and depresses a and then once again depresses space bar 46. The operator then depresses the restore alternate font key 54 thereby causing the display to no longer be a special font of italics.

The operator then depresses shift key 44 and types the word of "WALL" followed by four operations of backspace key 42 and five operations of underline key 40. This is not an abbreviation and is displayed as it is entered "STREET" is entered as its abbreviation, STR, all underlined followed by the space code. The full word "street" all in capitals and underlined with the space following underlined is displayed. JNL is then entered and the J is underlined, followed by the keying of space bar 46 three times. The full word "journal" all in capitals and with the characters only underlined, followed by a non-underlined space, is displayed.

The operator once again depresses alternative font key 52. The operator then types the word "Staff" in full followed by a space, which is displayed as typed since it is not an abbreviation. The operator then depresses the shift key 44, types the letter r and releases the shift key 44 and types the letters pt, followed by operation of space bar 46. That is an abbreviation and the corresponding full word, "reporter", appears in the final text with the first letter capitalized and all in italics.

Typing is continued in the manner described. In the final line the operator recognizes the phrase "Federal Reserve Board" as one which is listed in the dictionary of memory 24. Since it is desired to have the full phrase all in capitals, the operator depresses shift key 44 and types the f, the r, the b while that key 44 is depressed. The operator then depresses the space bar 46 and the data-handling equipment substitutes the full phrase "Federal Reserve Board" in all capitals for the abbreviation.

The details of extracting information from electronic memory 24, generating character graphic information in character generator 30, and displaying that information on CRT display 34 using logic 32 will not be discussed as they are essentially conventional. As is conventional, the contents of the memory 24 are read in logical order. (The actual contents may be stored in various places in memory 24, but kept in the intended logical relationship by pointers and various addressing techniques of processor 20.)

The final point of display of information as it is being entered is indicated on CRT display 34 by a visual pointer, known generally as the cursor. Such use of a cursor in graphic information processing is entirely standard and conventional. Entries from keyboard 10 are entered into information in memory 24 at the point designated by the cursor. Usually the cursor is positioned after the last entry of information. Where some erasure is desired, the backspacing operation by backspace key 42 may be conducted. This relocates the cursor into text. At that point, the entry from keyboard 10 of new character information would be read into memory 24 at the point designated by the cursor, with the prior code in memory 24 at that point simply being eliminated or modified as appropriate.

Where an underline is to be added in accordance with this invention, the prior code designating the character or other symbol is not destroyed. Instead one bit position in a multi-bit data-processing code designating a character is set from zero to one or vice versa in accordance with a predetermined scheme. That one bit position is reserved to define the underline status of the character defined by other bits of the code. The data-processing code is thereby tagged as an underlined character to the electronic data processing equipment. Similarly, the cursor may be backspaced to any point and the underline key 40 then depressed again and again. The cursor is moved forward one character place with each depression of the key 40, as is standard. Each code representative of the symbol or space at which the cursor is situated is modified at that one bit position to designate the same information as being underlined.

Where the information is to be in alternate color or in alternate font, this is signalled to the data processing equipment prior to the typing of the content involved by using the set alternate color key 48 and the set alternate font key 52. After the keys 48 or 52 have been depressed subsequent entry information from keyboard 10 creates the code indicative of the entered information with a bit position of the data-processing word reserved for the alternate color key (when key 48 was operated) and another bit position reserved for the alternate font information (when key 52 was operated) set from zero to one or vice versa in accordance with a predetermined scheme. The data-processing code for each character is thereby tagged as a character in alternate color, in alternate font, or both if both keys 48 and 52 have been operated. When such an alternate form of display is to terminate, the restore alternate color key 50 and the restore alternate font key 54 are operated to terminate the corresponding form of display. Subsequently, a character entered from the keyboard 10 is entered in a data-processing code for the character information which has the bit position designating alternate color or alternate font in the opposite state from that when the alternate color or alternate font respectively was designated.

All information entered into the system from keyboard 10 which is normally displayed is displayed on CRT display 34 even though that information may subsequentially be substituted for a longer word. Information printed as output on printer 21 is the same, information from memory 24 as is displayed on CRT display 34 and typically is printed in identical form. In the general purpose data processing system employed, processor 20 defines the last character entered of a series of characters which may be an abbreviation. Although this could be accomplished in any of a variety of standard techniques, the one employed uses a register of processor 20 which is set to the location of the start of information after a space code which terminates the possibility of prior information being an abbreviation. The difference between the current entry point and the entry point at the start of a possible abbreviation defines the sequence of characters which may be an abbreviation and is treated separately in the data processing manipulations as an abbreviation queue. This same information is not treated separately by the system with respect to the display, and the display includes the abbreviation information.

The remaining figures illustrate the basic operations conducted to carry out this invention. FIG. 3 shows the sequence for any keyboard entry. The diagrams are essentially conventional step-by-step or logical flow diagrams for major operations which are carried out at high speeds with internal operations which are now well within standard data-processing capabilities. As is conventional, an oval indicates the start or the end of a sequence, a rectangle indicates an action taken, a diamond indicates a logical decision the result of which may be yes or no. In the drawing, any line exiting horizontally results from a yes decision and any line exiting vertically results from a no decision from the question represented by the diamond. The letter K in the drawing represents any key entry. The checkered space symbol represents a space code, such as from space bar 46 of keyboard 10. An arrow to the left represents a backspace entry from key 42. A square represents a cursor, and when a symbol appears in or next to the cursor, that indicates the position of the cursor with respect to the data corresponding to the symbol. The underline symbol represents the underline. C represents any character or graphic symbol. A rainbow-like figure represents the alternate color, and the stylized I is tended to represent the alternate font, as it is suggestive of italics. The upward arrow represents a shift to upper case from keys 44, as distinguished from a shift to lower case, which is represented by downward pointed arrow. The small symbol in the form of a pennant represents the setting of a status flag in electronic data processor 20. The terminology "flag" being commonly used, the pennant symbol is selected so as to be suggestive of that term. A flag in electronic data processing is, of course, the setting of a memory or register condition or the like which can be examined by data processing logic for the existence of the condition being in a set or unset condition, the system then following a sequence of steps dictated by a predetermined data-handling sequence when the status is as found. Finally, the clearing of memory and flags is symbolized by the horizontal line across the top of the symbol of that being cleared. This is selected because such a symbolism is often used to indicate "not" in graphic languages.

Oval 60 in FIG. 3 has a K in the center, indicating that the sequence is the keystroke sequence. The code for the keystroke is entered into a keystroke buffer 62, which is simply electronic memory designated to hold the code from a keystroke entry from keyboard 10 until further processed as will be described. Normally, buffer 62 is not cleared until the next subsequent keystroke entry.

The contents of buffer 62 are examined in decision 64 to determine whether those contents represent a space code. If the answer of decision 64 is yes, the system moves immediately to the keystroke sequence 66, shown in FIG. 6 and discussed in detail subsequentially.

Where the contents of the buffer 62 are not a space code, the sequence moves to decision 67 and examines the contents of buffer 62 to determine if those contents are a backspace code. If the answer of that decision is yes, the cursor is moved one character back, and all logic and associated electronics of processor 20 also are readjusted to reflect the new position of the cursor. This movement of the cursor is indicated in action rectangle 68. The sequence is then terminated, as indicated by the oval 65 with an internal cross.

If the contents of keystroke buffer 62 do not represent backspace, the sequence moves on to underscore decision 69, at which the contents of keystroke buffer 62 are examined to determine if these contents represent underscore. If the answer is yes, the sequence moves to the underscore sequence 70 shown in FIG. 5 and discussed in detail subsequently.

If the contents of keystroke buffer 62 do not represent underscore, the sequence moves to character decision 71. At that step, the contents of keystroke buffer 62 are examined to determine that they represent a text entry or character, as distinguished from a format entry such as tabulation or line return. If the contents of the keystroke buffer 62 do represent a character, the sequence moves to the character sequence 72 shown in FIG. 4 and discussed in detail subsequently.

If the contents of keystroke buffer 62 do not represent a character, the sequence moves to the special color decision 74. If the contents of keystroke buffer 62 do represent the special color input, generated by the operation of the select alternate color key 48, the sequence moves to the set-alternate-color-flag action 76 and terminates, indicated by the oval 78 with an internal cross.

If the contents of keystroke buffer 62 are not the alternate color code, the sequence moves onto the alternate font decision 80, at which it examines the contents of keystroke buffer 62 to determine if they are of the code generated by operation of the alternate font key 52. If the answer is yes, the alternate font flag is set at action 82 and the sequence is terminated, indicated by oval 84 with an internal cross.

If the contents of keystroke buffer 62 are not found to be the alternate font code, the sequence moves to the up-shift decision 86. The contents of keystroke buffer 62 are examined to determine if they are the up-shift code. If so, the sequence moves to set-up-shift-flag action 88 and then terminates, illustrated by oval 90 with an internal cross.

If the contents of keystroke buffer 62 are not the up-shift code, the system moves on to restore-alternate-color decision 92. The contents of keystroke buffer 62 are examined to determine if they are the code generated by the restore alternate color key 50. If that is so, the alternate color flag is cleared at action 94, this being indicated by the horizontal line across the top. After the flag is cleared, the sequence is terminated, as indicated by the oval 96 with an internal cross.

If the contents of keystroke buffer 62 are not the restore alternate color code, the sequence moves to compare those contents with the restore alternate font code at decision 98. Contents of keystroke buffer 62 are examined to determine if they are the code generated by the restore alternate font key 54. If this comparison shows that the contents of keystroke buffer 62 are the restore alternate font code, the system moves to action 100 in which the alternate font flag is cleared. The sequence is then terminated, as indicated by the oval 102 with an internal cross.

If the contents of keystroke buffer 62 are not the restore alternate font code, the system moves on to downshift decision 104. If the contents of keystroke buffer 62 are found to be the down shift code, the system moves to action 106 in which the flag for up shift is cleared. The sequence is then terminated, as indicated by the oval 108 with the internal cross.

The system then moves on to decision 110 in which the code in keystroke buffer 62 is examined for any other appropriate function, such as tabulate and line return. If such other function is called for, the system moves to action 112 in which the function is performed and then terminates, as indicated by oval 114 with an internal cross. If the decision 110 shows no other function to be performed, then the sequence terminates, as indicated by the oval 116 with an internal cross.

For purposes of best explaining this invention, it is convenient to start at a point at which the key depressed is a key for an alphabetic character, not a space. Accordingly, the system in FIG. 3 will move through the no decision results of decisions 64, 67 and 69, until reaching the decision 71, at which point the system moves to the character sequence 72. The character sequence 72 is shown in FIG. 4. The system moves first to the alternate color flag decision 120, at which a yes condition occurs when the alternate color flag is set and a no condition occurs when the alternate color flag is not set. When the alternate color flag is set, indicative of a prior operation of key 48 calling for subsequent information to be in the alternate color, the system moves to action 122 at which the alternate color bit of the data processing keystroke buffer 62 is set to associate the alternate color attribute with the code for the character depressed. The system then moves back to decision 124, which is reached either directly when the alternate color flag is not set or is reached after the action 122 when the alternate color flag is set.

Decision 124 determines whether the alternate font flag is set. If that decision is yes, the system moves to action 126 at which the code in keystroke buffer 62 has the predesignated bit set which represents alternate font, thereby associating this attribute directly with the code in keystroke buffer 62. The sequence then moves to decision 128. Decision 128 is entered immediately when decision 124 shows that the alternate font flag is not set or is entered after the alternate font bit is set by action 126.

At decision 128 the up-shift flag is examined to determine if it is set. If so, the sequence moves to action 130, at which a predesignated bit representative of the up shift is set in keystroke buffer 62, thereby directly associating the up-shift attribute with the code in key-stroke buffer 62. If the up shift flag is not set, the sequence moves directly to decision 132. If the up-shift flag was set, the sequence moves to decision 132 after the action 130.

Decision 132 examines the abbreviation queue flag to determine if it is set. This flag is set, as will be described, when the contents of the queue representative of characters recently entered have been examined by the system in a manner which establishes that these characters cannot be an abbreviation to which the system responds.

If the abbreviation queue flag is set, the sequence moves directly to action 133, transfer of the contents of keystroke buffer 62 to the RAM. "RAM" is used as an abbreviation for the parts of memory 24 which are used as general purpose memory for the final form of the document rather than for some specific purpose related to the unique abbreviation features here being described. The designation "RAM" is selected as it suggests the common usage with regard to type of memory employed, since "RAM" is a common abbreviation for random access memory. After action 133, in which the contents of key-stroke buffer 62 are entered in general memory, the cursor is moved one step to the right by action 135.

When the abbreviation queue flag is not set, decision 132 is no and the sequence moves to decision 134, at which the number of characters in the abbreviation queue is examined to determine if that number is exactly three. If the answer to decision 134 is yes, the sequence moves to decision 136 at which the contents of key-stroke buffer 62 are examined to determine if they represent a character which is one of the characters used as a suffix abbreviation. In this preferred form, all abbreviations save abbreviations having a suffix are of three characters or less. No abbreviation is more than four characters. Accordingly, when three characters are in the abbreviation queue, the next character establishes that the entry will not be an abbreviation if the next character is not one of the limited number of characters which represents a suffix abbreviation. Accordingly, when the decision 136 is no, the present input is established as not being an abbreviation and the sequence moves to action 138, the setting of the abbreviation queue flag.

When action 138 is taken, the system moves to transfer the contents of the abbreviation queue to the status of being general information in memory, action 140. In the actual implementation this is implemented by designating the abbreviation queue with stored addresses or pointers locating areas in memory 24. Accordingly, no actual physical transfer of characters in the abbreviation queue to a different place in memory 24 is required at action 140. Instead, the rear pointer is changed to designate the point immediately past the last character entry. In a more generalized case, however, a hardware implementation or other physical transfer may be appropriate. The contents of buffer 62 are entered in general memory in action 133.

When decision 134 is no, the system moves to decision 142. In decision 142 the characters in the abbreviation queue are examined to determine if they are greater than three in number. Since the system is designed on the constraint that all abbreviations will be no more than four characters, this status indicates that the character cannot be an abbreviation, and accordingly, a yes answer at decision 142 calls out action 138, the setting of the abbreviation queue flag.

When the decision 142 is no or when decision 136 is yes, the entered character may be part of an abbreviation, and accordingly, the sequence moves to action 144, at which the character in keystroke buffer 62 is simply entered as the next character in the abbreviation queue. Subsequent to that, action 135 takes place at which the cursor is moved one character space to the right. The sequence terminates after that cursor movement, as indicated by oval 146 with an internal cross.

FIG. 5 illustrates the sequence 70 for entry of an underscore code by underscore key 40 of keyboard 10. The sequence first makes decision 150 to determine if the abbreviation queue flag is set. If the abbreviation queue flag is set, the sequence moves to decision 152 at which the cursor position is examined to determine if the cursor is over a character. If the cursor is over a character, code representing the underscored character is moved into the general document portion of memory 24 by action 154. This movement is directly into the document portion of memory 24 because the sequence is dependent upon the abbreviation queue flag being set and accordingly, it is known that the entry does not refer to an abbreviation.

If decision 152 indicates that the cursor was not over a character, then a space underscore is to be entered. The sequence moves to action 156 at which the abbreviation queue flag is reset. The sequence then moves to action 158 in which the abbreviation queue is cleared. Clearance of the abbreviation queue in this specific embodiment represents a clearance of address information or pointers within the system indicating the start and end of information entered as a possible abbreviation and thereby held separately within the logic of the system as being within the abbreviation queue. Physically, address information representing the location of the start and address information representing the end of the abbreviation queue are each brought to a status representing the location immediately following the character being entered. (They will be subtracted and a zero result noted to determine the abbreviation queue is clear. This is a standard data processing technique.)

After action 158, the sequence moves to action 160, which is the entry of a code for space with underscore in the document portion of memory 24. The sequence then moves after either action 154 or action 160 to action 162, which moves the cursor one character position to the right. Resetting of the abbreviation queue flag and clearing the abbreviation queue where the underscore is entered under the blank is consistent with the design approach of this system that a space, including an underscored space, represents the end of a possible code entry. An underscored space is therefore a point at which the start of a possible new abbreviation is begun.

When decision 150 finds the abbreviation queue flag not set, the system moves to decision 164, which examines the abbreviation queue to determine if it is cleared. If it is cleared, the system moves to decision 152 and moves from that point as previously described. If the abbreviation queue is not cleared, the sequence moves to decision 166 at which the cursor position is examined to determine if it is over a character. If the cursor is at a character, the sequence moves to action 168 at which the character designated by the cursor is modified to include the bit representative of underscore at the predetermined status indicating that the character is to be displayed underscored. After this action the cursor is moved forward in action 162. After action 162 the sequence is terminated, as indicated by oval 169 with an internal cross. Had the decision 166 found that the cursor was not over a character, then the underscored space sequence 170, is begun, as will be discussed in connection with FIG. 6.

Figure 6:
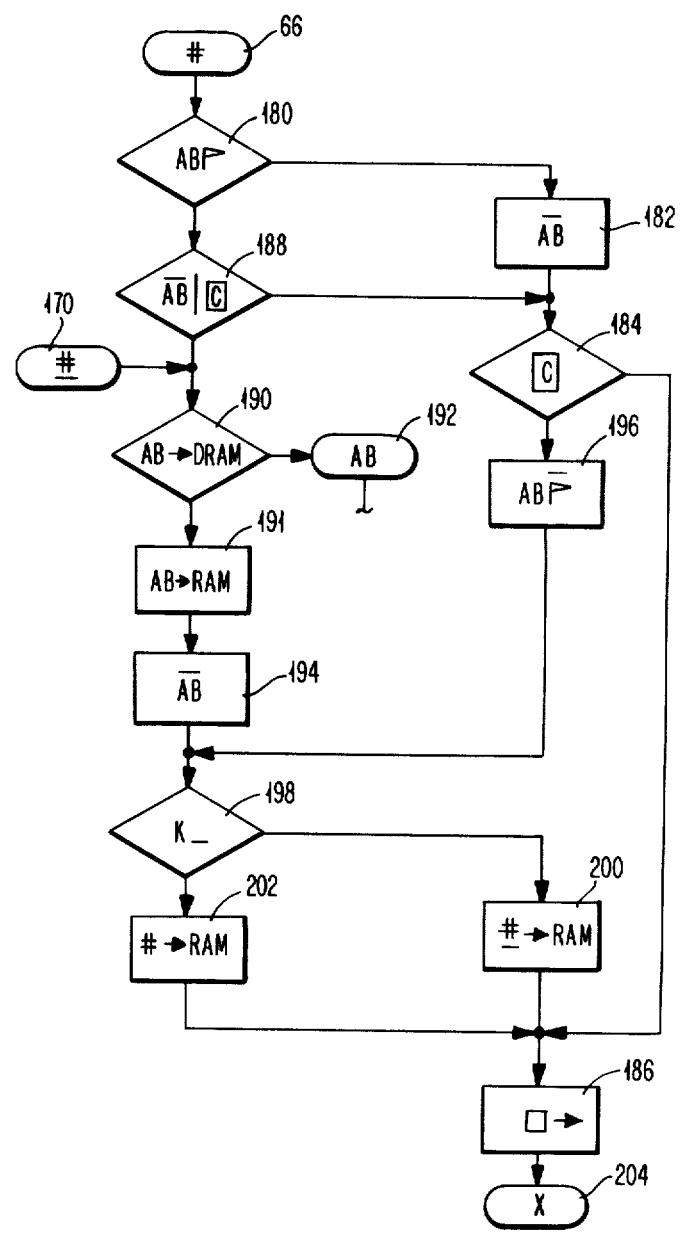
FIG. 6 illustrates the part of the sequence when the entry is a space.

The space sequence 66 is illustrated in FIG. 6. As there shown, the underscored space sequence 170 can originate part of that sequence and bypasses certain parts of it which occur from the normal space entry 66. Starting with the space entry 66, the sequence moves to decision 180, which determines if the abbreviation queue flag is set. If the abbreviation queue flag is set, the sequence moves to action 182, at which the abbreviation queue is cleared. After action 182, the sequence moves to decision 184, at which it determines whether the cursor is over a character. If that decision is yes, the system moves to action 186 in which the cursor is simply moved right one character space. This action is uniquely associated with the purposes of the cursor in that one manner of positioning the cursor is by use of the space bar 46 to move the cursor rightwardly and by the backspace key 42 to move the cursor leftwardly. Accordingly, where the cursor is over text, the desired function in response to space bar 46 is simply the movement of the cursor.

Where a decision 180 establishes that the abbreviation queue flag is not set, the sequence moves to decision 188. Decision 188 determines if the abbreviation queue is cleared or if the cursor is over a character. In either case the entry of the space code could not be related to an abbreviation in this specific form of implementation. When decision 188 is yes, the sequence therefore moves to decision 184 and continues from that decision. Decision 184 determines whether the cursor is over a character. Even though the abbreviation queue is not cleared, a space code with the cursor at a character does not designate a possible end of an abbreviation. Instead, action 186 is effected, the movement of the cursor one character space.

When decision 188 is no, the sequence moves to decision 190 in which the contents of the abbreviation queue are compared with the dictionary in memory 24, abbreviated in the diagram as DRAM. Underscored space sequence 170 also initiates decision 190. If this decision shows a match, the sequence moves to abbreviation sequence 192. If the decision 190 does not establish a match, the sequence moves to action 191, at which the contents of the abbreviation queue are moved into the document portion of memory 24. This reflects the fact that the entry of the space code always terminates the consideration of an abbreviation and the starting of a possible new abbreviation, and, accordingly, that material entered between space codes and not an abbreviation should be acted on as ordinary information. As previously indicated, in the actual implementation, the contents of the abbreviation queue may not need to be moved at all, but need only be recognized in the system as not now a part of a potential abbreviation. Thus, as shown, after whatever action is necessary to assure that the information in the abbreviation queue will appear as ordinary document material, the abbreviation queue is cleared at action 194. The sequence then moves to decision 198.

Decision 198 also may be reached from decision 184, discussed above. Decision 184 is no when the entry is not an abbreviation and a space code is being entered at a point at which the cursor is not over a character. This is indicative of the entry of a space which is to appear as a space rather than simply move the cursor. Accordingly, action 196 is taken, in which the abbreviation queue flag is cleared, providing for subsequent entries to be recognized as entries in a possible abbreviation. The sequence then moves to decision 198 in which it is determined whether keystroke buffer 62 contains an underscore status bit, as it would if the sequence of FIG. 6 is entered by underscored space sequence 170. (Buffer 62 would not contain the code for space when the entry is an underscore over blank.) If decision 198 is yes, the sequence moves to action 200, in which the code for space with the bit designating underscore set is entered in the document portion of memory 24.

If decision 198 is no, the sequence moves to action 202 in which the simple space code in buffer 62 is entered in the document portion of memory 24. After actions 184, 200 and 202, each representative of completion of an action at the point involved, the cursor is moved one character space to the right in action 186 and the sequence is terminated, indicated by oval 204 with an internal cross.

Figure 7:
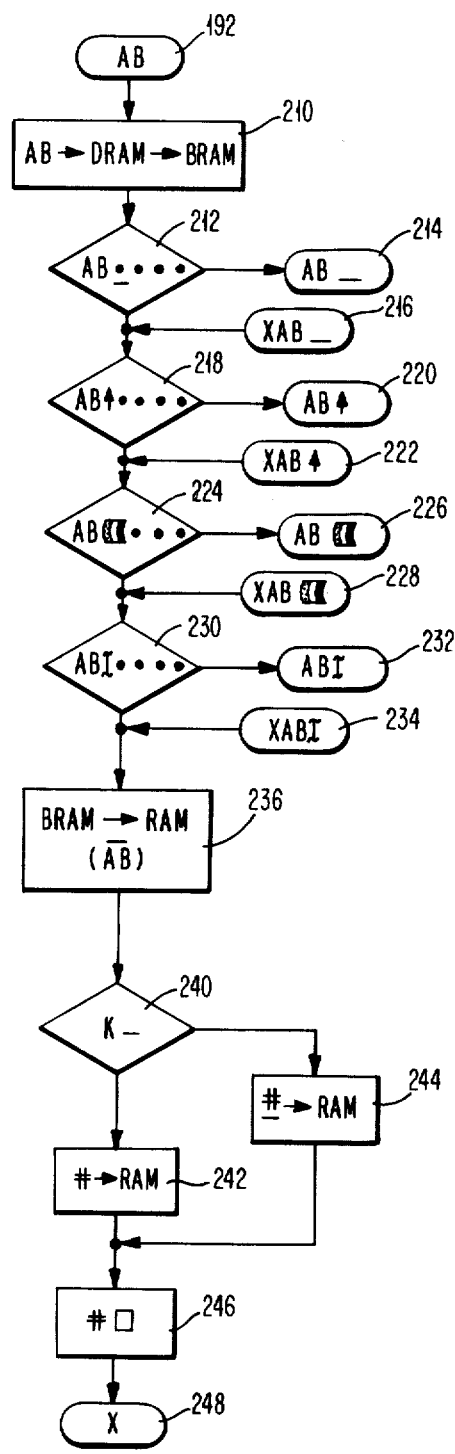
FIG. 7 illustrates the part of the entry when an abbreviation is recognized.

The abbreviation sequence 192 is shown in FIG. 7. The sequence first takes the action of comparing the abbreviation queue information with that in the dictionary in memory 24, shown symbolized in action 210 as DRAM, and then transferring the code for the full word to a buffer memory portion of memory 24, symbolized in action 210 by BRAM. After that action, the sequence proceeds to decision 212 in which the abbreviation queue is observed for an underline under the first character. If that decision is yes, the sequence moves to the abbreviation underline sequence 214 shown in FIG. 8. At the termination 216 of that sequence, the sequence of FIG. 7 is re-entered prior to decision 218.

Decision 218 therefore may be reached by the decision 212 for first character underline being no or by the termination 216 of the abbreviation underline sequence. Decision 218 observes the characters in the abbreviation queue for an up shift in the first character. If the answer is yes, the sequence proceeds to abbreviation up-shift sequence 220, shown in FIG. 9. The abbreviation sequence is re-entered at the termination 222 of abbreviation up-shift sequence 220.

The next decision, decision 224, is entered either from decision 218 being no or from the termination 222. Decision 224 observes the characters in the abbreviation queue for an alternate color designation in the first character. If the decision is yes, the sequence proceeds to alternate color sequence 226, shown in FIG. 10. The termination 228 of the abbreviation alternate-color sequence 226 re-enters the abbreviation sequence prior to decision 230.

Decision 230 is thereby entered either by the prior decision, decision 224, being no or by the termination 228 of the abbreviation alternate-color sequence 226. Decision 230 is the first-character-special-font decision. If decision 230 is yes, the sequence enters the abbreviation special-font sequence 232 shown in FIG. 11. The termination 234 of that sequence enters the abbreviation sequence of FIG. 7 prior to the next step which is action 236, transfer of the buffer memory portion of memory 24 contents into the document portion of memory 24.

This is done in the actual embodiment by writing the buffered BRAM information of action 210 over that of the abbreviation queue. This necessarily includes the clearing of the abbreviation queue. Since the display on CRT 34 is continually refreshed from text information stored in memory 24, overwriting of the abbreviation with the corresponding full word automatically substitutes the full word on the display for the abbreviation originally keyed by the operator.

After action 236, the contents of keystroke buffer 62 are examined in decision 240 to determine if they contain the code indicating underline. If the answer is yes, action 244 is taken, in which a code for space with underscore is entered in the document portion of memory 24. If decision 240 is no, a normal space code is added at action 242. These space codes correspond to the space code which necessarily had been entered because all abbreviation sequences end with a space code. The cursor is moved past that terminating space in action 246 and the sequence is terminated, as indicated by oval 248 with an internal cross.

FIG. 8 illustrates the abbreviation underline sequence 214. The first step in the sequence is decision 250 in which the characters in the abbreviation queue are examined to determine if more than one carry the underline status information. If the answer to decision 250 is yes, the sequence proceeds to action 252, in which all the character codes for each character in the buffer memory portion of memory 24 are modified to carry a status showing underline and then to action 253 in which the underscore bit in keystroke buffer 62 is set to designate underscore. (As is clear from the prior description with respect to FIG. 7, action 253 will cause the next following space code after the word in the buffer memory portion of memory 24 to have its status bit corresponding to underline to be set to indicate underline.) If the answer to decision 250 is no, the sequence proceeds to action 254 only, in which all of the characters in the buffer memory portion of memory 24 are modified to carry a status showing underline. The sequence is terminated at oval 216 after either action 254 or action 253.

The abbreviation up-shift sequence 220 is shown in FIG. 9. The first step in the sequence is decision 260, in which the characters in the abbreviation queue are examined to determine if more than one carry the up-shift status information. If the answer to decision 260 is yes, the sequence proceeds to action 262 in which the character code for each character in buffer memory is modified so that the status bit corresponding to up shift is set to indicate up shift. If the answer to decision 260 is no, the sequence proceeds to action 264 in which only the first character of the characters in the buffer memory portion of memory 24 is modified to carry a status showing up shift. The sequence is terminated at oval 222 after either action 264 or action 262.

Figure 10:
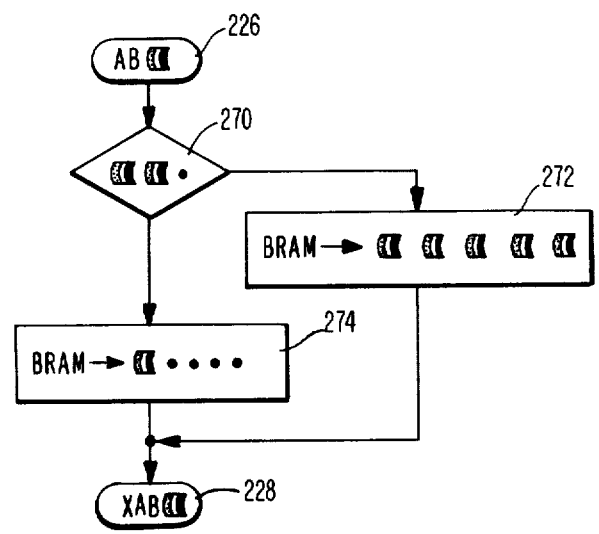
FIG. 10 illustrates the part of the abbreviation response for alternate color.

The abbreviation alternate-color sequence 266 is shown in FIG. 10. The first action is decision 270 in which the characters in the abbreviation queue are observed to determine if more than one carry the status bit indicative of alternative color. If the decision 270 is yes, the sequence proceeds to action 272 in which all of the characters in the buffer memory portion of memory 24 are modified to carry the status bit for alternative color in the state indicating alternative color. If the answer to decision 270 is no, the sequence proceeds to action 274 in which only the first character in the buffer memory portion of memory 24 is modified to carry the status bit entered for alternative color in the state indicating alternate color. The sequence is terminated at oval 228 after either action 274 or action 272.

Figure 11:
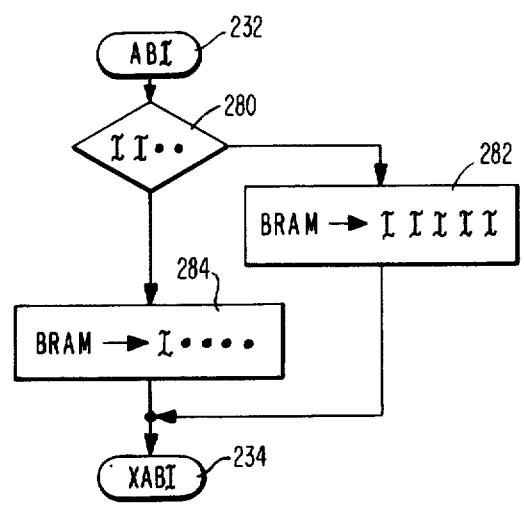
FIG. 11 illustrates the part of the abbreviation response for alternate font.

The sequence for abbreviation alternative-font 232 is shown in FIG. 11. The first step is the observation of the characters in abbreviation queue at decision 280 to determine if more than one carry the status bit for alternative font in a status indicating that the alternative font is selected. If the answer is yes, the sequence proceeds to action 282 in which all the characters in the buffer memory portion of memory 24 are modified to show a yes status for the alternative font. If the answer to decision 280 is no, the sequence proceeds to action 284 in which only the first character in the buffer memory portion of memory 24 is modified to carry the alternative font status as positive. The sequence is terminated at oval 234 after either action 284 or action 282.

It will be noted in connection with FIGS. 8, 9, 10 and 11 that the indication therein of the second special form designation is shown in the first two figures as being possibly in the third position, and is shown in FIG. 10 and FIG. 11 as being possibly in the second position. It should be understood that this entirely alternative and illustrative, as the basic gist of the system design is to respond to the second character being in any position.

In the typical data-handling system the characters in the abbreviation queue would be observed in order. When a second is found to be in the special status, the criteria would be satisfied and that sequence of steps would be terminated and the system would proceed to the next appropriate sequence of steps.

It will be clear that the preferred form has specific aspects which are entirely a matter of choice which could be implemented in various ways suggested or which would be clear to those familiar with word processing. Accordingly, patent coverage sought is not limited by preferred form shown, but should be commensurate with the scope of the invention, particular reference being made to the following claims.

What is claimed is:

1. A text-creating system for creating output text from an input comprising signals in which signals of said input comprising at least two separate signals representing alphabetic characters are compared against a list of abbreviations, each abbreviation corresponding to a full word, and in which the corresponding full word is substituted in said output text for each abbreviation in said input, comprising means to produce words of said output text in normal form, in a first special form, and in a second special form, means responsive to said input in an abbreviation with predetermined parts in a special form for producing said output text for the corresponding full word in said first special form, and means responsive to said input in an abbreviation with less than said predetermined parts in a special form for producing said output text for the corresponding full word in said second special form; one of said first and said second special forms having a part only in a form different from said normal form and the other of said first and said second special forms having substantially all in a form different from said normal form.

2. The text-creating system as in claim 1 in which said special form of input is capitalization and one of said first special form and said second special form is all capitalization of said word and the other of said first special form and said second special form is capitalization of the first character only of said word.

3. The text-creating system as in claim 2 in which said input with less than said predetermined parts in a special form has the first character only of said input in said special form and in which said first special form is all capitalization of said word and said second special form is capitalization of the first character only of said word.

4. The text-creating system as in claim 1 in which said special form of input represents a special character font and one of said first special form and said second special form is all of said word in said special font and the other of said first special form and said second special form is the first character only of said word in said special font.

5. The text-creating system as in claim 4 in which said input with less than said predetermined parts in a special form has the first character only of said input in said special form and in which said first special form is all of said word in said special font and said second special form is the first character only of said word in said special font.

6. The text-creating system as in claim 1 in which said special form of input represents a special color of display and one of said first special form and said second special form is all of said word in said special color and the other of said first special form and said second special form is the first character only of said word in said special color.

7. The text-creating system as in claim 6 in which said input with less than said predetermined parts in a special form has the first character only in said special form and in which said first special form is all of said word in said special color and said second special form is the first character only of said word in said special color.

8. The text-creating system as in claim 1 in which said special form of input is underline and one of said first special form and said second special form is underline of all characters of and the space following said word and the other of said first special form and said second special form is underline of all characters only of said word.

9. The text-creating system as in claim 8 in which said input with less than said predetermined parts in a special form has the first character only in said special form and in which said first special form is underline of all characters of and the space following said word and said second special form is underline of the all characters only of said word.

10. A word-processing system comprising a keyboard, high-speed data processing means for information handling, and text storage means, said data processing means including means to translate alphabetic characters from said keyboard entered in a predetermined code to corresponding words defined by a dictionary of comparisons in said data processing means, said data processing means comprising means to recognize when the first character only of said entered code is in a first special condition and to produce said corresponding word for said entered code in said text storage means in a first special form, said data processing means also comprising means to recognize when at least two characters of said entered code from said keyboard are in a special condition and to produce said corresponding word for said entered code in said text storage means in a second special form.

11. The word-processing system as in claim 10 in which said special condition represents capitalization and one of said first special form and said second special form is all capitalization of said word and the other of said first special form and said second special form is capitalization of the first character only of said word.

12. The word-processing system as in claim 11 in which said first special form is capitalization of the first character only of said word and said second special form is all capitalization of said word.

13. The word-processing system as in claim 10 in which said special condition represents a special character font and one of said first special form and said second special form is all of said word in said special font and the other of said first special form and said second special form is the first character only of said word in said special font.

14. The word-processing system as in claim 13 in which said first special form is the first character only of said word in said special font and said second special form is all of said word in said special font.

15. The word-processing system as in claim 10 in which said special condition represents a special color of display and one of said first special form and said second special form is all of said word in said special color and the other of said first special form and said second special form is the first character only of said word in said special color.

16. The word-processing system as in claim 15 in which said first special form is the first character only in said special color and said second special form is all of said word in said special color.

17. The word-processing system as in claim 10 in which said special condition represents underline and one of said first special form and said second special form is underline of all characters of and the space following said word and the other of said first special form and said second special form is underline of all characters only of said word.

18. The word-processing system as in claim 17 in which said first special form is underline of the all characters only of said word and said second special form is underline of all characters of and the space following said word.

19. A word-processing system comprising a keyboard, high-speed data processing means for information handling, and text storage means, said data processing means including means to translate aphabetic characters from said keyboard entered in a predetermined code to corresponding words defined by a dictionary of comparisons in said data processing means, said data processing means comprising means responsive to a first entered code in an abbreviation with only one character in a first special condition representing a first special form comprising one special form selected from a group of special forms consisting of capitalization, special font, special color and underline for producing said corresponding word for said first entered code in said text storage means with a first predetermined part in said first special form, means responsive to said first entered code with more than one character in said first special condition for producing said corresponding word for said first entered code in said text storage means with a second predetermined part in said first special form, one of said first predetermined part and said second predetermined part being the first character only of said word; means responsive to said first entered code with only one character in a second special condition representing a second special form selected from said group of special forms, for producing said corresponding word for said first entered code in said text storage means with a third predetermined part in said second special form, and means responsive to said first entered code with more than one character in said second special condition for producing said corresponding word for said first entered code in said text storage means with a fourth predetermined part in said second special form, one of said third predetermined part and said fourth predetermined part being the first character only of said word.

20. The word-processing system as in claim 19 in which said group of special forms consists of capitalization and special font.

21. The word-processing system as in claim 19 in which said group of special forms consists of capitalization and special color.

22. The word-processing system as in claim 19 in which said group of special forms consists of capitalization and underline.

23. The word-processing system as in claim 19 also comprising means responsive to said first entered code with only one character in a third special condition representing a third special form selected from said group of special forms for producing said corresponding word for said first entered code in said text storage means with a fifth predetermined part in said third special form, and means responsive to said first entered code with more than one characters in said third special condition for producing said corresponding word for said first entered code in said text storage means with a sixth predetermined part in said third special form, one of said fifth predetermined part and said sixth predetermined part being the first character only of said word.

24. The word-processing system as in claim 19 in which all said means responsive to only one character are responsive only when said one character is the first character of said entered code.

25. The word-processing system as in claim 20 in which all said means responsive to only one character are responsive only when said one character is the first character of said entered code.

26. The word-processing system as in claim 21 in which all said means responsive to only one character are responsive only when said one character is the first character of said entered code.

27. The word-processing system as in claim 22 in which all said means responsive to only one character are responsive only when said one character is the first character of said entered code.

28. The word-processing system as in claim 23 in which all said means responsive to only one character are responsive only when said one character is the first character of said entered code.

29. The word-processing system as in claim 24 in which said first predetermined part and said third predetermined part are the first character of said word when the special form is capitalization, special font, and special color and all of the characters only of said word when the special form is underline, and said second predetermined part and said fourth predetermined part are all of said word and the space after said word when the special form for a predetermined part is underline.

30. The word-processing system as in claim 25 in which said first predetermined part and said third predetermined part are the first character of said word and said second predetermined part and said fourth predetermined part are all of said word.

31. The word-processing system as in claim 26 in which said first predetermined part and said third predetermined part are the first character of said word and said second predetermined part and said fourth predetermined part all of said word.

32. The word-processing system as in claim 27 in which said first predetermined part and said third predetermined part are the first character of said word when the special form is capitalization and all of the characters only of said word when the special form is underline and said second predetermined part and said fourth predetermined part are all of said word and the space after said word when the special form is underline.

33. The word-processing system as in claim 28 in which said first predetermined part, said third predetermined part and said fifth predetermined part are the first character of said word when the special form is capitalization, special font, and special color and all of the characters only of said word when the special for is underline, and said second predetermined part, said fourth predetermined part, and said sixth predetermined part are all of said word and the space after said word when the special form is underline.

* * * * *